US010459447B2

(12) United States Patent
Foster et al.

(10) Patent No.: US 10,459,447 B2
(45) Date of Patent: Oct. 29, 2019

(54) SYSTEM AND METHOD FOR GENERATING PARTITIONED SWATHS

(71) Applicants: CNH Industrial America LLC, New Holland, PA (US); Autonomous Solutions, Inc., Mendon, UT (US)

(72) Inventors: Christopher Alan Foster, Mohnton, PA (US); Nathan Eric Bunderson, Providence, UT (US); Taylor Chad Bybee, Logan, UT (US); Daniel John Morwood, Petersboro, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 194 days.

(21) Appl. No.: 15/627,207

(22) Filed: Jun. 19, 2017

(65) Prior Publication Data

US 2018/0364726 A1    Dec. 20, 2018

(51) Int. Cl.
*A01B 69/04* (2006.01)
*A01D 41/127* (2006.01)
*G05D 1/02* (2006.01)

(52) U.S. Cl.
CPC .......... *G05D 1/0219* (2013.01); *A01B 69/008* (2013.01); *G05D 1/0274* (2013.01); *G05D 1/0291* (2013.01); *G05D 2201/0201* (2013.01)

(58) Field of Classification Search
CPC .. A01B 69/008; G05D 1/0219; G05D 1/0274; G05D 1/0291; G05D 2201/0201
See application file for complete search history.

(56) References Cited

U.S. PATENT DOCUMENTS

| 7,010,425 | B2 | 3/2006 | Gray et al. |
| 7,689,356 | B2 | 3/2010 | Dix et al. |
| 8,498,788 | B2 * | 7/2013 | Kondekar ............... A01B 69/00 701/445 |
| 8,983,767 | B2 | 3/2015 | Pieper et al. |
| 2017/0316692 | A1 * | 11/2017 | Rusciolelli ............. G08G 1/164 |
| 2018/0156622 | A1 * | 6/2018 | Mouthaan .......... G01C 21/3407 |

* cited by examiner

*Primary Examiner* — Anshul Sood
(74) *Attorney, Agent, or Firm* — Rebecca L. Henkel; Rickard K. DeMille

(57) ABSTRACT

A control system of an agricultural work vehicle system includes a controller that includes a memory and a processor. The controller is configured to determine multiple partitions based, at least in part, on a map of an agricultural field. Further, the controller is configured to determine a partition list of the multiple partitions based, at least in part, on a set of bounding characteristics of each of the multiple partitions. In addition, the controller is configured to determine an order of the multiple partitions based on the partition list of the multiple partitions. Moreover, the controller is configured to output a signal indicative of a travel path for the agricultural work vehicle.

10 Claims, 5 Drawing Sheets

SYSTEM AND METHOD FOR GENERATING PARTITIONED SWATHS

BACKGROUND

The present disclosure relates generally to a system and method for generating partitioned swaths.

Work vehicles (e.g., tractors, tow-vehicles, implements, air-carts, etc.) may travel along a variety of paths through an agricultural field in the process of completing an operation (e.g., harvesting, tilling, planting, etc.). For example, work vehicles may cover a significant portion of the agricultural field during an operation. In the process of covering the agricultural field, different types of paths may be utilized to ensure full coverage of the agricultural field. For example, the different types of paths may include paths along a boundary of the agricultural field, in rows through the center of the agricultural field, around the edges of obstacles in the agricultural field, or any other path through the agricultural field. Organizing and planning routes of paths may be improved to decrease the time to complete an operation, to increase the effectiveness of an operation, or to increase the coverage of the agricultural field.

BRIEF DESCRIPTION

In one embodiment, a control system of an agricultural work vehicle system includes a controller that includes a memory and a processor. The controller is configured to determine multiple partitions based, at least in part, on a map of an agricultural field. Further, the controller is configured to determine a partition list of the multiple partitions based, at least in part, on a set of bounding characteristics of each of the multiple partitions. In addition, the controller is configured to determine an order of the multiple partitions based on the partition list of the multiple partitions. Moreover, the controller is configured to output a signal indicative of a travel path for the agricultural work vehicle.

In another embodiment, a method for creating a travel path through an agricultural field for a work vehicle includes determining, via a controller, multiple partitions based, at least in part, on a map of an agricultural field. The method further includes determining, via the controller, a partition list of the multiple partitions based, at least in part, on a set of bounding characteristics of each of the multiple partitions. In addition, the method includes determining, via the controller, an order of the multiple partitions based on the partition list of the multiple partitions. Moreover, the method includes outputting, via the controller, a signal indicative of a travel path for the agricultural work vehicle.

In a further embodiment, one or more tangible, non-transitory, machine-readable media comprising instructions configured to cause a processor to determine multiple partitions based, at least in part, on a map of an agricultural field. Further, the instructions are configured to cause the processor to determine a partition list of the multiple partitions based, at least in part, on a set of bounding characteristics of each of the multiple partitions. In addition, the instructions are configured to cause the processor to determine an order of the multiple partitions based on the partition list of the multiple partitions. Moreover, the instructions are configured to cause the processor to output a signal indicative of a travel path for the agricultural work vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
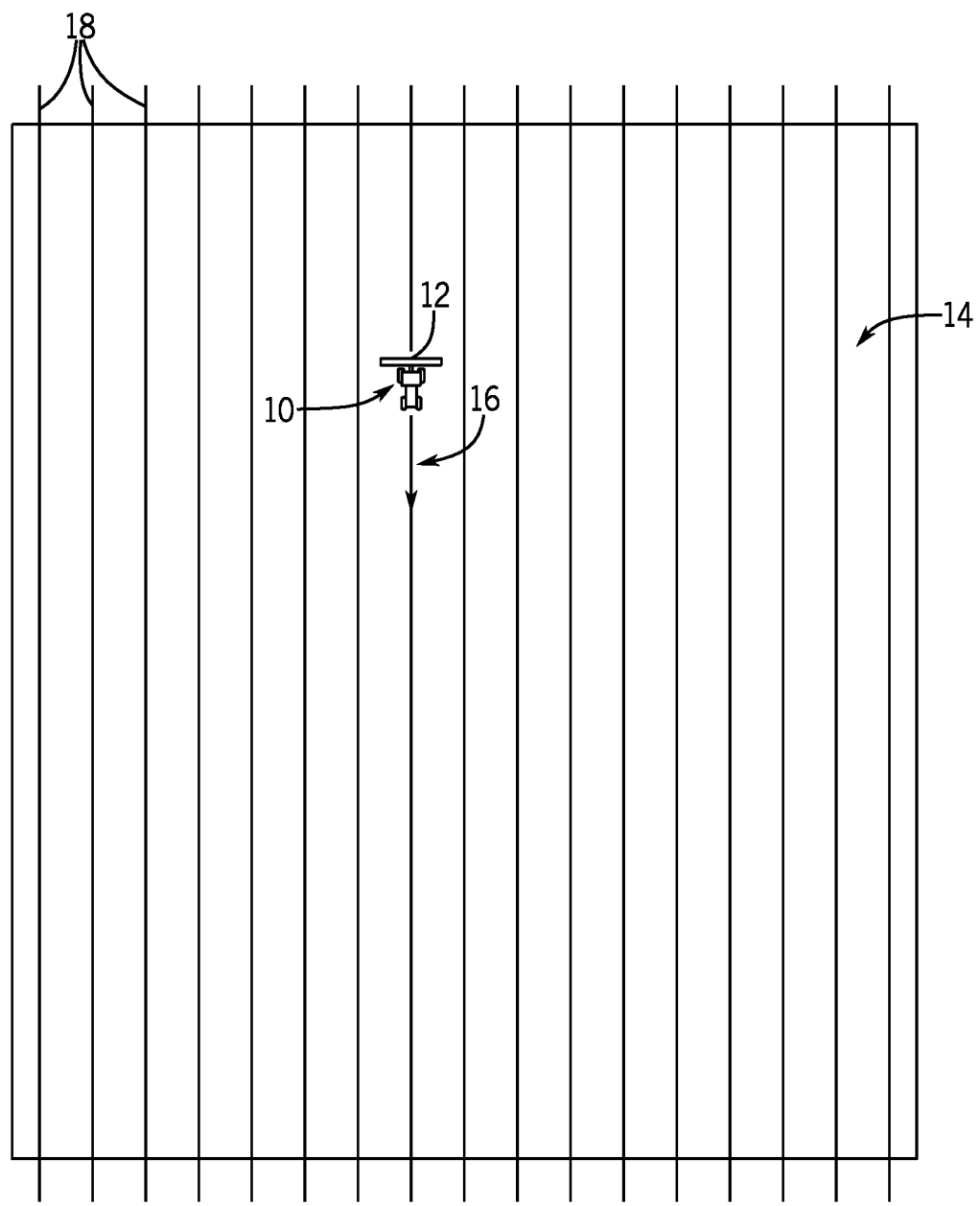
FIG. 1 is a schematic diagram of an embodiment of a work vehicle and an agricultural implement within a field.

FIG. 1 is a schematic diagram of an embodiment of a work vehicle 10 and an agricultural implement 12 within an agricultural field 14. The work vehicle 10 (e.g., tractor, harvester, or other prime mover) is configured to tow the agricultural implement 12 throughout the field 14 along a direction of travel 16. In certain embodiments, the work vehicle 10 is directed (e.g., via an operator or an automated system) to traverse the field along substantially parallel rows 18. However, it should be appreciated that the work vehicle may be directed to traverse the field along other paths in alternative embodiments. For example, the work vehicle may travel along an edge of the field, thereby following the shape of a boundary of the field, or the work vehicle may travel around an obstacle disposed in the field.

The agricultural implement 12 may be any suitable implement for performing agricultural operations throughout the field 14. For example, in certain embodiments, the agricultural implement 12 may be a tillage tool, a fertilizer application tool, a seeding or planting tool, a cutting tool, or a harvesting tool, among others. In the present embodiment, the agricultural implement 12 is towed and/or pushed by the work vehicle 10. In other embodiments, the agricultural implement may be integrated within the work vehicle.

Further, in some embodiments, the agricultural implement may include an air cart that is towed behind the agricultural implement or integrated within the implement or work vehicle.

Furthermore, the shape of the field 14 may include shapes other than a single quadrilateral, the field 14 may include obstacles (e.g., natural features such as rocks or trees, or manmade features such as buildings or roads), or the field 14 may have a width that is not an integer multiple of a swath width (e.g., width of the implement 12). For example, the shape of the field may include 3, 4, 5, 6, 7, 8, or more sides. In such embodiments, the field 14 may be partitioned and the partitions ordered to enable the work vehicle 10 to travel through the field 14 along an efficient path.

Figure 2:
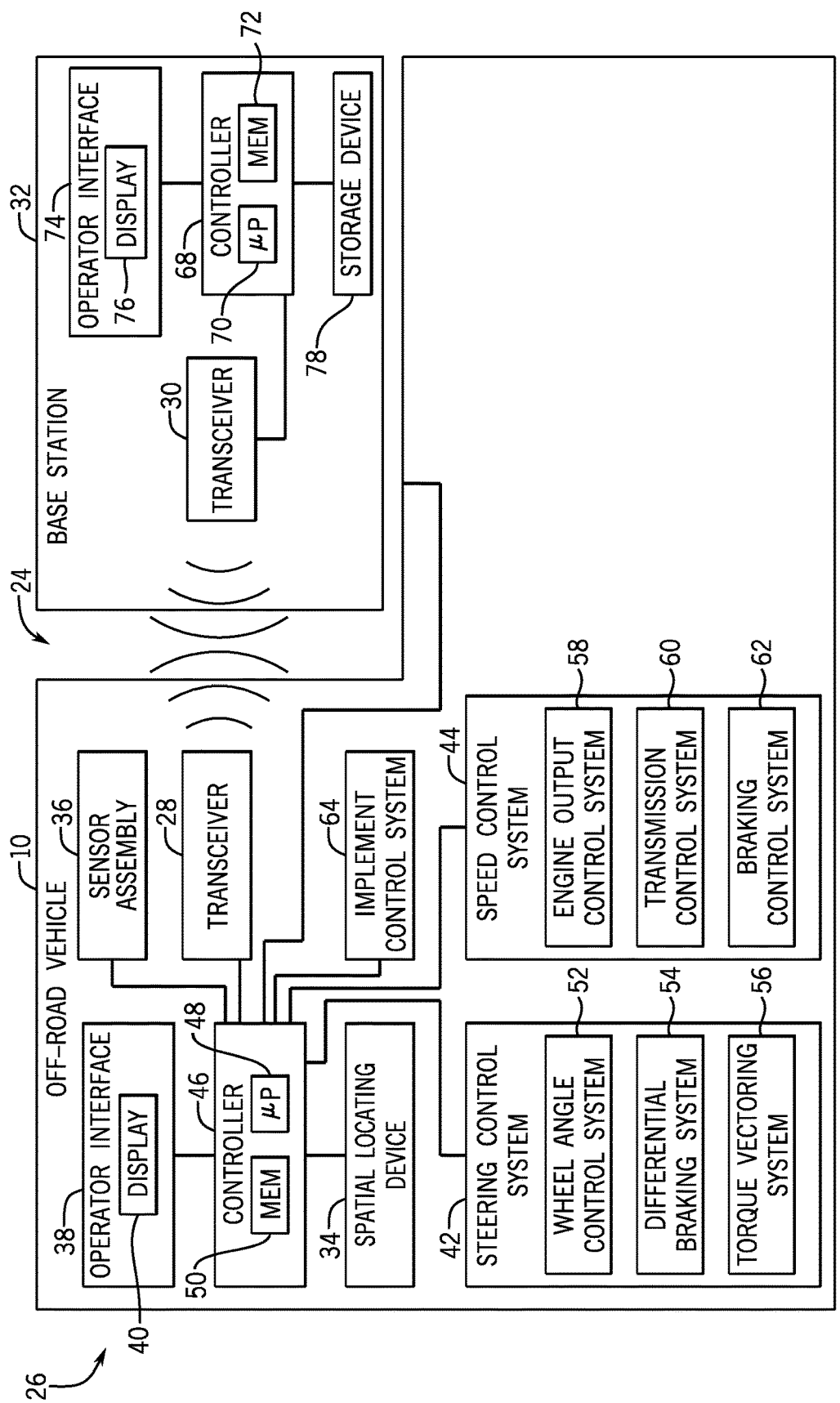
FIG. 2 is a schematic diagram of an embodiment of a control system that may be utilized to control the work vehicle and the agricultural implement of FIG. 1.

FIG. 2 is a schematic diagram of an embodiment of a control system 24 that may be utilized to control the work vehicle 10 and the agricultural implement of FIG. 1. In the illustrated embodiment, the control system 24 includes a vehicle control system 26 (e.g., mounted on the work vehicle 10), and the vehicle control system 26 includes a first transceiver 28 configured to establish a wireless communication link with a second transceiver 30 of a base station 32. The first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol. In other embodiments, the base station 32 may be omitted, and components of the base station 32 may also be omitted or distributed among the implement, the air cart, or the work vehicle.

In the illustrated embodiment, the vehicle control system 26 includes a spatial locating device 34, which is mounted to the work vehicle 10 and configured to determine a position of the work vehicle 10. As will be appreciated, the spatial locating device may include any suitable system configured to determine the position of the work vehicle, such as a global positioning system (GPS) receiver, for example. In certain embodiments, the spatial locating device 34 may be configured to determine the position of the work vehicle relative to a fixed point within the field (e.g., via a fixed radio transceiver). Accordingly, the spatial locating device 34 may be configured to determine the position of the work vehicle relative to a fixed global coordinate system (e.g., via the GPS) or a fixed local coordinate system. In certain embodiments, the first transceiver 28 is configured to broadcast a signal indicative of the position of the work vehicle 10 to the second transceiver 30 of the base station 32. Using the position of the work vehicle 10 during traversal of the field 14, a map may be generated of the field 14. For example, as the work vehicle 10 or another lighter scouting vehicle travels around a portion of the field 14, the control system 24 and/or the vehicle control system 26 may generate a map of the field 14. In some embodiments, the work vehicle 10 or scouting vehicle may be directed to travel around a perimeter of the field 14 to determine the outer bounds of the field 14 and then to determine a traversal route. Additionally or alternatively, a map may be updated during operation of the work vehicle 10 and locations of objects that interfere with operation, such as roads, structures, fixtures (e.g., irrigation systems), or other objects that may be fixed within the field 14 may be stored.

In addition, the vehicle control system 26 includes a sensor assembly 36. In certain embodiments, the sensor assembly is configured to facilitate determination of conditions of the work vehicle 10 and/or the field 14. For example, the sensor assembly 36 may include multiple sensors (e.g., infrared sensors, ultrasonic sensors, magnetic sensors, etc.) configured to monitor a rotation rate of a respective wheel or track and/or a ground speed of the work vehicle. The sensors may also monitor operating levels (e.g., temperature, fuel level, etc.) of the work vehicle 10. Furthermore, the sensors may monitor conditions in and around the field, such as temperature, weather, wind speed, humidity, objects in the field, and other such conditions.

In the illustrated embodiment, the off-road vehicle 10 includes a movement control system that includes a steering control system 42 configured to control a direction of movement of the off-road vehicle 10 and a speed control system 44 configured to control a speed of the off-road vehicle 10. In addition, the off-road vehicle 10 includes an implement control system 64 configured to control operation of an implement (e.g., towed by the off-road vehicle 10). The vehicle control system 26 includes a vehicle controller 46 communicatively coupled to the first transceiver 28, the spatial locating device 34, the sensor assembly 36, and an operator interface 38. In certain embodiments, the vehicle controller 46 is configured to receive a location of the work vehicle 10 and to instruct the vehicle to move based at least in part on the location of the work vehicle 10 and a route of traversal through the field 14. In certain embodiments, the vehicle controller 46 is an electronic controller having electrical circuitry configured to process data from the first transceiver 28, the spatial locating device 34, the sensor assembly 36, or a combination thereof, among other components of the work vehicle 10. In the illustrated embodiment, the vehicle controller 46 includes a processor, such as the illustrated microprocessor 48, and a memory device 50. The vehicle controller 46 may also include one or more storage devices and/or other suitable components. The processor 48 may be used to execute software, such as software for controlling the work vehicle 10, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 48 may include one or more reduced instruction set (RISC) processors.

The memory device 50 may include a volatile memory, such as random access memory (RAM), and/or a nonvolatile memory, such as read-only memory (ROM). The memory device 50 may store a variety of information and may be used for various purposes. For example, the memory device 50 may store processor-executable instructions (e.g., firmware or software) for the processor 48 to execute, such as instructions for controlling the work vehicle 10. The storage device(s) (e.g., nonvolatile storage) may include ROM, flash memory, a hard drive, or any other suitable optical, magnetic, or solid-state storage medium, or a combination thereof. The storage device(s) may store data (e.g., field maps), instructions (e.g., software or firmware for controlling the work vehicle, etc.), and any other suitable data.

In the illustrated embodiment, the steering control system 42 includes a wheel angle control system 52, a differential braking system 54, and a torque vectoring system 56. The wheel angle control system 52 may automatically rotate one or more wheels or tracks of the off-road vehicle (e.g., via hydraulic actuators) to steer the off-road vehicle along a path through the field (e.g., around mapped objects in a field). By way of example, the wheel angle control system 52 may rotate front wheels/tracks, rear wheels/tracks, and/or intermediate wheels/tracks of the off-road vehicle, either individually or in groups. The differential braking system 54 may independently vary the braking force on each lateral side of the off-road vehicle to direct the off-road vehicle along the path through the field. Similarly, the torque vectoring system 56 may differentially apply torque from the engine to wheels and/or tracks on each lateral side of the off-road vehicle, thereby directing the off-road vehicle along the path through the field. While the illustrated steering control system 42 includes the wheel angle control system 52, the differential braking system 54, and the torque vectoring system 56, it should be appreciated that alternative embodiments may include one or more of these systems, in any suitable combination. Further embodiments may include a steering control system 42 having other and/or additional systems to facilitate directing the off-road vehicle along the path through the field (e.g., an articulated steering system, etc.).

In the illustrated embodiment, the speed control system 44 includes an engine output control system 58, a transmission control system 60, and a braking control system 62. The engine output control system 58 is configured to vary the output of the engine to control the speed of the off-road vehicle 10. For example, the engine output control system 58 may vary a throttle setting of the engine, a fuel/air mixture of the engine, a timing of the engine, and/or other suitable engine parameters to control engine output or a combination thereof. In addition, the transmission control system 60 may adjust an input-output ratio within a transmission to control the speed of the off-road vehicle. Furthermore, the braking control system 62 may adjust braking force, thereby controlling the speed of the off-road vehicle 10. While the illustrated speed control system 44 includes the engine output control system 58, the transmission control system 60, and the braking control system 62, it should be appreciated that alternative embodiments may include one or two of these systems, in any suitable combination. Further embodiments may include a speed control system 44 having other and/or additional systems to facilitate adjusting the speed of the off-road vehicle.

The implement control system 64 is configured to control various parameters of the agricultural implement towed by the off-road vehicle. For example, in certain embodiments, the implement control system 64 may be configured to instruct an implement controller (e.g., via a communication link, such as a CAN bus or ISOBUS) to adjust a penetration depth of at least one ground-engaging tool of the agricultural implement. By way of example, the implement control system 64 may instruct the implement controller to reduce the penetration depth of each tillage point on a tilling implement, or the implement control system 64 may instruct the implement controller to disengage each opener disc/blade of a seeding/planting implement from the soil. Reducing the penetration depth of at least one ground-engaging tool of the agricultural implement may reduce the draft load on the off-road vehicle. Furthermore, the implement control system 64 may instruct the implement controller to transition the agricultural implement between a working position and a transport portion, to adjust a flow rate of product from the agricultural implement, or to adjust a position of a header of the agricultural implement (e.g., a harvester, etc.), among other operations.

In certain embodiments, the vehicle controller 46 may utilize a map of the field to determine a travel path for the work vehicle 10. For example, the travel path may include a swath (i.e., a continuous curvature path including straight line segments (e.g., rows), arcs, clothoids, splines, or any combination thereof). For example, the work vehicle 10 may travel through the field along rows, as illustrated in FIG. 1. In some embodiments, the characteristics of the field may not enable the work vehicle 10 to travel in uniform, parallel rows, as illustrated in FIG. 1. For example, the field may include obstacles that the work vehicle 10 travels around, the field may be shaped such that the work vehicle 10 travels along rows in different directions, etc. Further, during some operations (e.g., seeding, harvesting, tilling, etc.) the work vehicle 10 may travel in a lap along the edge (e.g., a headland or boundary) of the field before travelling along rows across the field.

Thus, the field may be split into partitions which enables the partitions of the field to be ordered for the travel path of the work vehicle 10. For example, each partition may include a different type of travel path, such as a path around the edge of the field, a path around an obstacle, a path that includes a group of substantially parallel rows, etc. After the field has been split into partitions, the vehicle controller 46 may order the partitions such that the work vehicle 10 travels through the partitions sequentially. Further, as discussed above, at least one partition may include a group of substantially parallel rows. Thus, the vehicle controller 46 may analyze such partitions to determine an order for the rows such that the work vehicle 10 travels along the rows in the determined order.

In the illustrated embodiment, the work vehicle 10 includes an operator interface 38 communicatively coupled to the vehicle controller 46. The operator interface 38 is configured to present data from one or more work vehicles and/or the agricultural implement(s) to an operator (e.g., data associated with the travel path of the work vehicle, data associated with operation of the work vehicle, data associated with operation of the agricultural implement, etc.). The operator interface 38 may also enable the user to input information about the field and/or the crops that may enable the controller to determine the route through the field. For example, the operator may indicate width of each row, a start position, known obstacles, type of operation being conducted, or any other information which may affect a travel path. The operator interface 38 is also configured to enable an operator to control certain functions of the work vehicle (e.g., starting and stopping the work vehicle, instructing the work vehicle to follow a route through the field, etc.). In the illustrated embodiment, the operator interface 38 includes a display 40 configured to present information to the operator, such as the position of the work vehicle 10 within the field, the speed of the work vehicle 10, and the path of the work vehicle 10, among other data. The display 40 may facilitate touch inputs, and/or the operator interface 38 may include other input device(s), such as a keyboard, mouse, or other human-to-machine input devices. In addition, the operator interface 38 (e.g., via the display 40, via an audio system, etc.) is configured to notify the operator of the determined travel path for to traversing the field.

As previously discussed, the control system 26 is configured to communicate with the base station 32 via the first transceiver 28 and the second transceiver 30. In the illustrated embodiment, the base station 32 includes a base station controller 68 communicatively coupled to the second transceiver 30. The base station controller 68 is configured to output commands and/or data to the work vehicle 10. For example the base station controller 68 may be configured to determine a map of the field (i.e., determining a shape of the field, objects that may impede a path of the work vehicle, compaction alleys disposed in the field, areas of the field that an operation may be conducted, etc.) and/or the travel path of the work vehicle through the field. The base station controller 68 may then send instructions indicative of the map of the field and/or the travel path of the work vehicle to the vehicle controller 46, thereby enabling the vehicle controller 46 to direct the work vehicle 10 though the field. In addition, the base station controller 68 may output start and stop commands to the vehicle controller 46, and/or the base station controller 68 may instruct the work vehicle 10 to follow a selected/planned path through the field 14 based on the map and the location of the vehicle 10, which may be determined at the vehicle controller 46 and/or the base station controller 68.

In certain embodiments, the base station controller 68 is an electronic controller having electrical circuitry configured to process data from certain components of the base station 32 (e.g., the second transceiver 30). In the illustrated embodiment, the base station controller 68 includes a processor, such as the illustrated microprocessor 70, and a memory device 72. The processor 68 may be used to execute software, such as software for providing commands and/or data to the vehicle controller 46, and so forth. Moreover, the processor 70 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors. The memory device 72 may include a volatile memory, such as RAM, and/or a nonvolatile memory, such as ROM. The memory device 72 may store a variety of information and may be used for various purposes. For example, the memory device 72 may store processor-executable instructions (e.g., firmware or software) for the processor 70 to execute, such as instructions for providing commands and/or data to the vehicle controller 46.

In the illustrated embodiment, the base station 32 includes a user interface 74 communicatively coupled to the base station controller 68. The user interface 74 is configured to present data from one or more work vehicles and/or the agricultural implement(s) to an operator (e.g., data associated with the travel path of the work vehicle(s), data associated with operation of the work vehicle(s), data associated with operation of the agricultural implement(s), etc.). The user interface 74 may also enable the user to input information about the field and/or the crops that may enable the base station controller 68 and/or the vehicle controller 46 to alter the route through the field. For example, the operator may indicate a width of each row, a starting position of one or more work vehicles, position(s) of obstacle(s), type of operation being conducted, or any other information which may affect a travel path. The user interface 74 is also configured to enable an operator to control certain functions of the work vehicle(s) (e.g., starting and stopping the work vehicle(s), instructing the work vehicle to follow route(s) through the field, etc.). In the illustrated embodiment, the user interface 74 includes a display 76 configured to present information to the operator, such as the position of the work vehicle(s) within the field, the speed of the work vehicle(s), and the path(s) of the work vehicle(s), among other data. The display 76 may be configured to receive touch inputs, and/or the user interface 74 may include other input device(s), such as a keyboard, mouse, or other human-to-machine input device(s). In addition, the user interface 74 (e.g., via the display 76, via an audio system, etc.) is configured to notify the operator of the determined travel path for traversing the field.

In the illustrated embodiment, the base station 32 includes a storage device 78 communicatively coupled to the base station controller 68. The storage device 78 (e.g., nonvolatile storage) may include ROM, flash memory, a hard drive, or any other suitable optical, magnetic, or solid-state storage medium, or a combination thereof. The storage device(s) may store data (e.g., field maps), instructions (e.g., software or firmware for commanding the work vehicle(s), etc.), and any other suitable data.

While the vehicle control system 26 of the control system 24 includes the vehicle controller 46 in the illustrated embodiment, it should be appreciated that in alternative embodiments, the vehicle control system 26 may include the base station controller 68. For example, in certain embodiments, control functions of the vehicle control system 26 may be distributed between the vehicle controller 46 and the base station controller 68. In further embodiments, the base station controller 68 may perform a substantial portion of the control functions of the vehicle control system 26. Indeed, any processes of the vehicle controller 46 and the base station controller 68 may be allocated to either controller in at least some embodiments. Furthermore, at least part of the processes described herein may be performed via a cloud-based service or other remote computing, and such computing is considered part of the vehicle control system 26.

Figure 3:
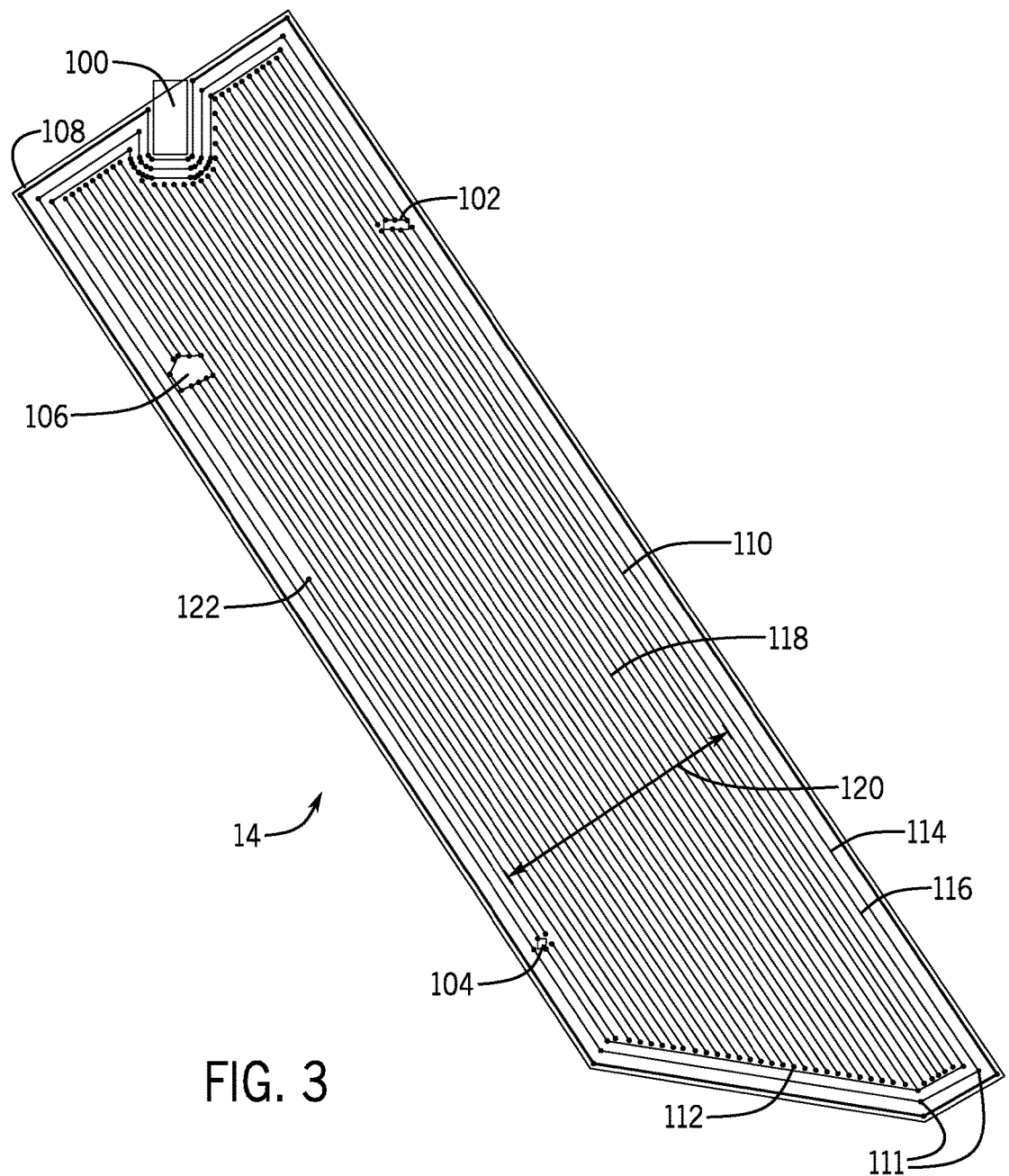
FIG. 3 is a top view of an embodiment of a field that includes swath paths indicative of a travel path of a work vehicle.

FIG. 3 is a top view of an embodiment of the field 14 that includes swath paths indicative of the travel path of a work vehicle. In the illustrated embodiment, the field 14 includes a number of obstacles. For example, the field 14 includes a first obstacle 100, a second obstacle 102, a third obstacle 104, and a fourth obstacle 106. In some embodiments, one or more of the obstacles may not impede the progress of certain work vehicles, or the field 14 may include more obstacles that impede the progress of certain work vehicles. Further, the location of the obstacle may alter the treatment of the obstacle. For example, the first obstacle 100 intersects a boundary 108 of the field 14. Thus, the first obstacle 100 is treated as part of the boundary 108 for determining partitions of the field 14. The second obstacle 102, the third obstacle 104, and the fourth obstacle 106 are internal to the boundary 108, and are not treated as parts of the boundary 108. Rather, each of the second obstacle 102, the third obstacle 104, and the fourth obstacle 106 form a respective area through which the work vehicle cannot pass.

Accordingly, swath paths 110 (e.g., lines along which the work vehicle travels) do not intersect the boundary 108 or any of the obstacles. The swath paths 110 represent the path along which the work vehicle travels through the field. Although, in operation, the work vehicle may travel along curves to completely traverse the field 14, the swath paths 110 are illustrated as straight lines for demonstrative purposes. For example, points 111 illustrate instantaneous changes in direction, the work vehicle may travel along a curve to change direction from one swath path to the next. Further, in the illustrated embodiment, each endpoint 112 of the swath paths 110 is denoted by a dot. The endpoints 112 denote where the work vehicle changes directions to continue the operation. For example, an interior endpoint 122 illustrates where the field 14 becomes too narrow for the swath path 110 to continue.

In the illustrated embodiment, the field 14 includes six different partitions (i.e., each partition is a separate portion of the field 14). A first partition 114 and a second partition 116 each include a single swath line 110 in a lap (e.g., a cleanup lap or a headland lap) around the edge of the field 14 that follows the shape of the boundary 108, while respecting the constraints and capabilities of the work vehicle and/or implement. A third partition 118 includes all of the swath paths 110 included in a section 120, and the third partition 118 covers the interior portion of the field 14 that is surrounded by the second partition 116 and excludes the area blocked by the obstacles. The other three partitions are laps around each of the second obstacle 102, the third obstacle 104, and the fourth obstacle 106.

Figure 4:
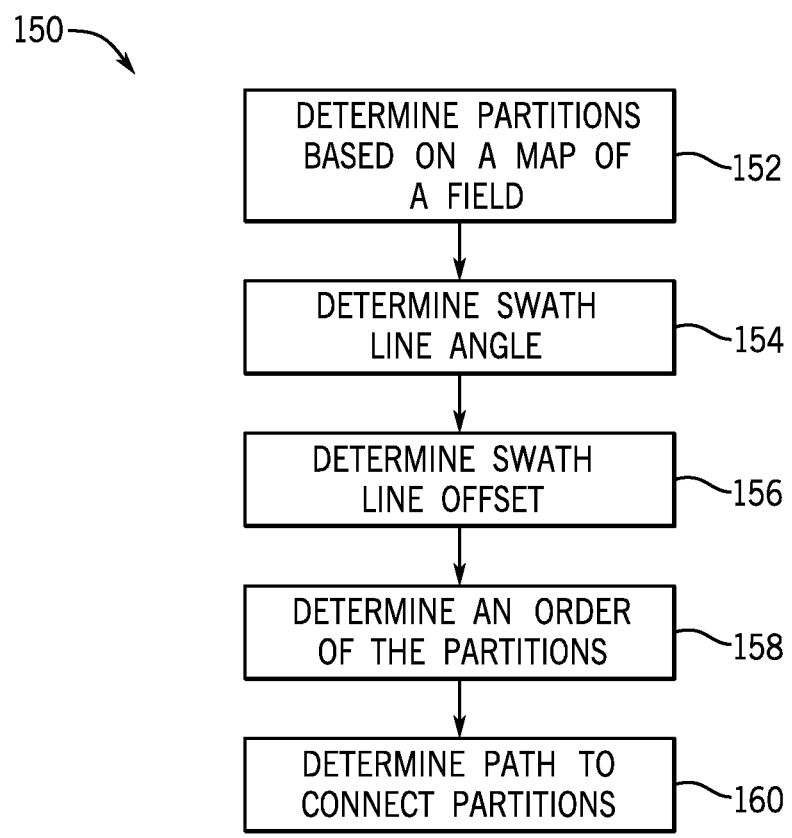
FIG. 4 is a flowchart of an embodiment of a process for generating partitions of a field and ordering the partitions.

FIG. 4 is a flowchart of an embodiment of a process 150 for generating partitions of a field and ordering the partitions. The process 150 decreases the time to complete an operation in the field. Although the following process 150 includes a number of operations that may be performed, it should be noted that the process 150 may be performed in a variety of suitable orders (e.g., the order that the operations are discussed, or any other possible order). All of the operations of the process 150 may not be performed. Further, all of the operations of the process 150 may be performed by the vehicle controller, the base station controller, or a combination thereof.

A map of the field may be received, and partitions of the field may be determined (block 152) based on the map of the field. As discussed above, there may be different types of partitions that include paths that follow an exterior boundary of the field, such as a cleanup lap or a headland lap (e.g., a cleanup or headland lap partition), or paths that follow the shape of an obstacle that does not intersect the exterior boundary (e.g., an obstacle partition). Further, if an obstacle intersects the exterior boundary of the field, the edge of the obstacle may be considered to be a part of the exterior boundary. Moreover, some obstacles may be small enough (e.g., telephone poles) such that the work vehicle or implement may slightly adjust a swath path to travel around the obstacle. In addition, obstacles may include roads, such as compaction alleys (i.e., areas where crops are not grown to facilitate travel of one or more work vehicles), that extend through at least a portion of the field. Further, another type of partition may include multiple, substantially parallel rows (e.g., an interior partition). Further, these partitions may include only convex angles, such that a field with an 'L' shape would include two of these partitions because the interior of a field with an 'L' shape includes a concave interior angle.

Further, when determining (block 152) partitions of the field, the type of work vehicle may be taken into account. For example, some types of vehicles may be able to traverse certain obstacles that other types of vehicles may not. Accordingly, some obstacles may be ignored (i.e., the obstacle does not affect the partitions or swath paths within a partition) for some vehicles and taken into account for other vehicles. Further, if the edges of multiple obstacles intersect one another, the multiple obstacles may be treated as a single obstacle for purposes of partitioning the field.

In addition, when determining partitions, certain properties are taken in to account for each of the types of partitions. For example, the swath path for a cleanup or headland partition may depend, at least in part, on the width of the work vehicle or implement. For example, the swath path that represents the cleanup or headland partition may be translated half of the width of the work vehicle or implement toward the center of the field from the outer boundary. Such an offset may enable the edge of the work vehicle or implement to be at the outer boundary. Thus, if a second cleanup or headland partition is utilized, the swath path for the second cleanup or headland partition is translated one and one half times the width of the work vehicle or implement toward the center of the field from the outer boundary. Further, in some embodiments, the swath path may be adjusted to take into account the turning capabilities (e.g., turn radius, etc.) of the work vehicle or implement. For example, a work vehicle or implement may not be capable of making a sharp turn, thus, a sharp edge may be replaced with a curve (e.g., a clothoid or arc).

Further, the swath paths for an obstacle partition may depend, at least in part, on the width of the work vehicle or implement (e.g., the width may be the width of whichever is wider of the work vehicle or implement). For example, the swath path that represents the obstacle partition may be translated one half of the width of the work vehicle or implement away from the obstacle. Such an offset enables the edge of the work vehicle or implement to clear the edge of the obstacle. In addition, if a second obstacle partition is utilized, the swath path for the second obstacle partition is translated one and one half times the width of the work vehicle or implement away from the obstacle. Further, in some embodiments, the swath path may be adjusted to take into account the turning capabilities of the work vehicle or implement. For example, a work vehicle or implement may not be capable of making a sharp turn, thus, a sharp edge may be replaced with a curve (e.g., a clothoid or arc).

Next, the angle of the swath paths for each interior partition is determined (block 154). Because each of the swath paths is substantially parallel within a particular partition, an angle for the swath paths is chosen for each interior partition. The angle may be relative to any line, such as one of the cardinal directions (i.e., north, east, south, and west), a line of the exterior boundary, or any other suitable line. Further, the angle may be input by an operator or the angle may be determined by the controller. For example, if the controller determines the angle, the controller may rotate the swath paths at an incremental change in radians from zero to pi radians. For each angle, the controller determines the lengths of the shortest swath path and the longest swath paths, and determines the difference between the shortest swath path and the longest swath path. After determining the value for each angle, the controller determines the angle associated with the best value. For example, the angle associated with the smallest difference between the shortest swath path and the longest swath path may be chosen. In some embodiments, the controller may determine other types of values such as the number of swath paths, the number of turns, an expected time to completion, or any other suitable value for each angle. In these embodiments, the angle associated with these other values may be chosen, such as the angle associated with the lowest number of swath paths, the lowest number of turns, or the lowest expected time to completion.

Next, an offset of the swath paths is determined (block 156). The offset of the swath paths is based, at least in part, on the width of the work vehicle or implement. For example, the swath path may represent the path that the center of the work vehicle or implement traverses. Thus, the swath paths may be offset, or separated from one another, by a distance equal to about one half the width of the work vehicle or implement. In some embodiments, the distance between the swath paths may be less than one half the width of the work vehicle or implement, such that there is at least some overlap between the swaths. For example, during a harvesting operation, including some overlap may increase the amount of crop that is harvested, or if an integer number of swaths does not cover the entire partition, overlapping swaths may enable the number of swaths to be an integer number. Further, in some embodiments, the swath paths may not represent the path that the center of the work vehicle or implement traverses. Instead, the swath paths may represent the path that some other portion of the vehicle traverses, such as a right edge, a left edge, or any point in between.

In some embodiments, multiple work vehicles may travel through the field during a single operation. If the multiple work vehicles are the same width, then the multiple work vehicles may each travel along any of the determined partitions. In some embodiments, the multiple work vehicles may have different widths from one another. In such embodiments, each work vehicle may only travel through partitions with swath path offsets that have been determined for the width of the respective work vehicle.

Then, the order of the partitions is determined (block 158). The order of the partitions depends, at least in part, on the type of operation being performed. For example, during a harvesting operation, the headland laps may be performed before other types of partitions because the other types of partitions are completely encircled by the headland laps. Conversely, during a tilling operation, the headland or cleanup laps may be performed last so that the work vehicle does not drive over already tilled portions of the field. The order of the partitions may be dependent on the type of operation, and a list (e.g., a hierarchy) of the partitions may be determined, such that the list may be performed from first to last or from last to first. Lists that include a hierarchy may include multiple levels and each level may include one or more partitions. Levels that include multiple partitions may be listed separately from the rest of the list. Further, some levels may include a sub-hierarchy, such that one partition is inserted into the middle of another partition, thus a list would include a portion of a first partition, then a second partition, followed by another portion of the first partition.

In one embodiment, the partitions are listed based on each of the partitions bounding characteristics (e.g., which partitions are bound by a particular partition and which partitions bound the particular partition), which may enable an operation to be completed starting from the outside of the field and working toward the inside of the field, or starting from the inside of the field and working toward the outside of the field. For example, the headland or cleanup lap closest to the exterior boundary may encircle all of the other partitions. Thus, the outermost lap bounds all of the other partitions in the field. Further, separate interior partitions may be bound by the same headland or cleanup lap partition, but the interior partitions do not bound one another. Thus, the separate interior partitions are at the same level of bounding. Therefore, the order of the separate interior partitions may depend, at least in part, on other factors, such as proximity of endpoints of partitions, potential overlapping of swaths between separate partitions (e.g., the likelihood that operating in one partition will cause the work vehicle to travel in portions of another partition), or any other factor.

Further, the partitions that are laps around obstacles (e.g., obstacle partitions) are considered bounded based on the intersection of the edges of the obstacle with other partitions. For example, an obstacle with edges that intersect only the swath paths of one interior partition is considered bounded by that interior partition. However, if the edges of an obstacle intersect multiple partitions, the intersections are examined. First, the first and last intersections on both sides of the obstacle are determined. The first and last intersections are located on the swath paths that intersect the obstacle, but are adjacent to a swath path that does not intersect the obstacle. In some embodiments, there may be multiple first intersections and multiple last intersections. After the first and last intersections are determined, the obstacle partition may be considered bounded by the partition that includes the first intersection or the partition that includes the last intersection. For example, the partition that includes the first intersection may be a cleanup or headland lap partition, and the partition that includes the last intersection may be an interior partition. Thus, the obstacle partition may be considered bounded be either the cleanup or headland lap partition or the interior partition.

In some embodiments, the obstacle partition and the partition that bounds the obstacle partition may form a sub-hierarchy level, such that the obstacle partition is completed during the completion of the bounding partition. For example, if the obstacle partition is bound by an interior partition, during operation, the work vehicle may traverse a portion of the interior partition, then the obstacle partition, then another portion of the interior partition.

Thus, an example list of partitions may include a cleanup lap partition that bounds an interior partition that bounds an obstacle partition. Accordingly, the order of the partitions may include the cleanup lap partition first, the interior partition second, and the obstacle partition third, or in the reverse order. Further, in some embodiments, the order may include the cleanup lap partition first, a first portion of the interior partition second, the obstacle partition third, and a second portion of the interior partition fourth, or in the reverse order.

Next a path connecting the partitions is determined (block 160). The endpoints of consecutive partitions (e.g., partitions that are ordered consecutively) may not connect to one another. Thus, a connecting path to link the endpoints of consecutive partitions may be determined to enable the vehicle to travel from the end point of on partition to the starting point of another partition. The path may be a curved path (e.g., a clothoid or arc) and/or may include one or more line segments that connects the endpoints.

Figure 5A:
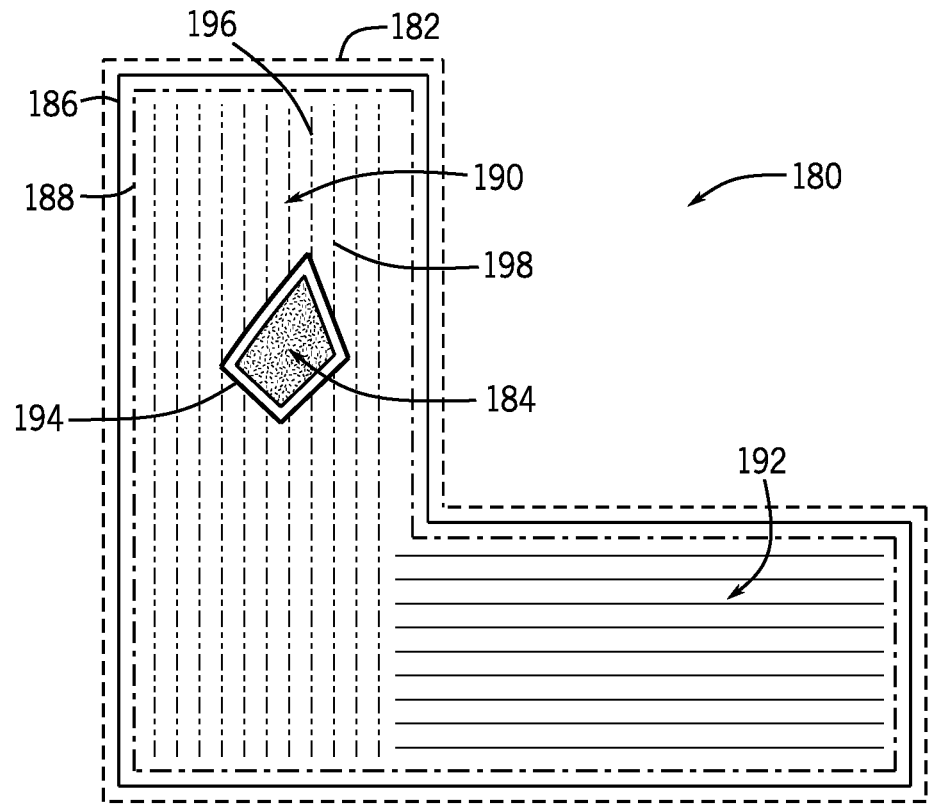
FIG. 5A is a top view of an embodiment of a field having multiple partitions.

FIG. 5A is a top view of an embodiment of a field 180 having multiple partitions. The field 180 is 'L' shaped, and includes an outer boundary 182 and an obstacle 184. Further, the partitions of the field 180 are split into a first headland partition 186, a second headland partition 188, a first interior partition 190, a second interior partition 192, and an obstacle headland partition 194.

As illustrated, the obstacle headland partition 194 intersects only the swath paths of the first interior partition 190. Thus, the obstacle headland partition 194 forms an inner bound rather than an outer bound on the first interior partition 190. In the present embodiment, a first intersecting swath path 196 is the first swath path of the first interior partition 190 to intersect the obstacle headland partition 194, and a last intersecting swath path 198 is the last swath path of the first interior partition 190 to intersect the obstacle headland partition 194. Thus, the obstacle headland partition 194 may be completed when the work vehicle is travelling along the first intersecting swath path 196 or when the work vehicle is travelling along the last intersecting swath path 198.

Figure 5B:
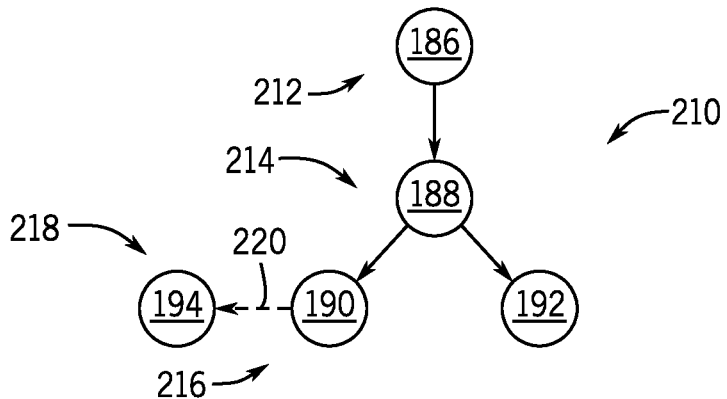
FIG. 5B is a schematic diagram of an embodiment of a partition list of the partitions illustrated in FIG. 5A.

FIG. 5B is a schematic diagram of an embodiment of a partition list 210 of the partitions illustrated in FIG. 5A. The partition list 210 serves as a visual of a hierarchy of the partitions. Further, the partition list 210 may be displayed to an operator via an operator interface. The partition list 210 is organized such that the top of the list, the first headland partition 186, bounds all of the other partitions, and the bottom of the list, the obstacle headland partition 194, bounds none of the other partitions. Thus, the first headland partition 186 is at a first level 212 and bounds all of the partitions at lower levels. Next, the second headland partition 188 is at a second level 214 because it is bound by the first headland partition 186. The first interior partition 190 and the second interior partition 192 are both at a third level 216 because they are bound by both the first headland partition 186 and the second headland partition 188. Then, the obstacle headland partition 194 is at a parallel level 218 because it forms an inner bound around the first interior partition 190. Further, an arrow 220 connects the first interior partition 190 to the obstacle headland partition 194 to indicate the inner bound relationship.

As described above, the element list 210 may be used to determine the order of the partitions. Further, the obstacle headland partition 194 may be completed in the middle of the partition that directly bounds it. Accordingly, the obstacle headland partition 194 may be completed after a first portion of the first interior partition 190 has been completed, but before a second portion of the first interior partition 190 has been completed. Moreover, as discussed above, the order of partitions at the same level may depend on other factors (e.g., connecting paths between partitions, etc.). Thus, the first interior partition 190 and the second interior partition 192 may be ordered in any suitable manner, for instance, the first interior partition 190 may be ordered before the second interior partition 192, or the second interior partition 192 may be ordered before the first interior partition 190.

Further, the order of the partitions may be dependent on the type of operation being performed. For example, a harvesting operation may order the partitions from the top-down such that the first headland partition 186 is completed first, and one of the first interior portion 190 or the second interior portion 192 is completed last. Other operations, such as a tilling operation, may order the partitions from the bottom-up, such that the first interior portion 190 or the second interior portion 192 is completed first, and the first headland partition 186 is completed last. Further, as discussed above, the obstacle headland partition 194 may be completed during completion of the first interior partition 190. Once the partitions are determined and ordered, a controller (e.g., the vehicle controller or the base station controller) instructs a speed control system and a steering control system to move the work vehicle along the swath paths.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system for an agricultural work vehicle comprising:
   a controller comprising a memory and a processor, wherein the controller is configured to:
   determine a plurality of partitions based, at least in part, on a map of an agricultural field;
   determine a partition list of the plurality of partitions based, at least in part, on a set of bounding characteristics of each of the plurality of partitions;
   determine an order of the plurality of partitions based on the partition list of the plurality of partitions;
   determine one or more swath paths for each of the plurality of partitions; and
   output a signal indicative of a travel path for the agricultural work vehicle based on the partition list of the plurality of partitions, the order of the plurality of partitions, and the one or more swath paths for each of the plurality of partitions;
   wherein the one or more swath paths of at least one of the plurality of partitions comprises a plurality of swath paths, and the controller is configured to determine the plurality of swath paths by:
   determining a set of angled swath paths for a plurality of incremental angles for the plurality of swath paths;
   determining a length of each swath path of the set of angled swath paths for each of the plurality of incremental angles;
   determining a lowest difference between a shortest swath path and a longest swath path for each set of angled swath paths for each incremental angle; and
   selecting the set of angled swath paths having the lowest difference between the shortest swath path and the longest swath path.

2. The control system of claim 1, wherein the partition list comprises at least one level with two or more partitions of the plurality of partitions arranged in a sub-hierarchy.

3. The control system of claim 1, wherein the controller is configured to determine a connection path to connect consecutive partitions of the plurality of partitions.

4. The control system of claim 3, wherein the connection path is a clothoid or spline.

5. The control system of claim 1, wherein the controller is configured to output instructions for a plurality of work vehicles, and wherein the controller is configured to determine an order of the plurality of partitions for each of the plurality of work vehicles.

6. The control system of claim 5, wherein each of the plurality of work vehicles has a different width, and wherein the controller is configured to assign at least one of the plurality of partitions to a respective work vehicle of the plurality of work vehicles based, at least in part, on the different widths of the plurality of work vehicles.

7. One or more tangible, non-transitory, machine-readable media comprising instructions configured to cause a processor to:
   determine a plurality of partitions based, at least in part, on a map of an agricultural field;
   determine a partition list of the plurality of partitions based, at least in part, on a set of bounding characteristics of each of the plurality of partitions;
   determine an order of the plurality of partitions based on the partition list of the plurality of partitions;
   determine one or more swath paths for each of the plurality of partitions; and
   output a signal indicative of a travel path for an agricultural work vehicle based on the partition list of the plurality of partitions, the order of the plurality of partitions, and the one or more swath paths for each of the plurality of partitions;
   wherein the one or more swath paths of at least one of the plurality of partitions comprises a plurality of swath paths, and the instructions are configured to cause the process to determine the plurality of swath paths by:
   determining a set of angled swath paths for a plurality of incremental angles for the plurality of swath paths;
   determining a length of each swath path of the set of angled swath paths for each of the plurality of incremental angles;
   determining a lowest difference between a shortest swath path and a longest swath path for each set of angled swath paths for each incremental angle; and
   selecting the set of angled swath paths having the lowest difference between the shortest swath path and the longest swath path.

8. The one or more tangible, non-transitory, machine-readable media comprising instructions of claim 7, wherein the instructions are configured to cause the processor to determine an offset for each of the one or more swath paths for at least one of the plurality of partitions.

9. The one or more tangible, non-transitory, machine-readable media comprising instructions of claim 7, wherein the instructions are configured to cause the processor to determine an obstacle in the agricultural field based on a type of the agricultural work vehicle.

10. A control system for an agricultural work vehicle comprising:
a controller comprising a memory and a processor, wherein the controller is configured to:
determine a plurality of swath paths for a partition of an agricultural field; and
output a signal indicative of a travel path for the agricultural work vehicle based on the plurality of swath paths;
wherein the controller is configured to determine the plurality of swath paths by:
determining a set of angled swath paths for a plurality of incremental angles for the plurality of swath paths;
determining a length of each swath path of the set of angled swath paths for each of the plurality of incremental angles;
determining a lowest difference between a shortest swath path and a longest swath path for each set of angled swath paths for each incremental angle; and
selecting the set of angled swath paths having the lowest difference between the shortest swath path and the longest swath path.

* * * * *